United States Patent
Paek et al.

(10) Patent No.: US 8,819,807 B2
(45) Date of Patent: Aug. 26, 2014

(54) APPARATUS AND METHOD FOR ANALYZING AND MONITORING SAP APPLICATION TRAFFIC, AND INFORMATION PROTECTION SYSTEM USING THE SAME

(71) Applicant: Somansa Co., Ltd, Seoul (KR)

(72) Inventors: Seung Tae Paek, Seoul (KR); Yong Pil Hur, Seoul (KR); Tae Wan Kim, Seoul (KR); Sang Man Lee, Daejeon (KR)

(73) Assignee: Somansa Co., Ltd, Seoul (KR)

( * ) Notice: Subject to any disclaimer, the term of this patent is extended or adjusted under 35 U.S.C. 154(b) by 0 days.

(21) Appl. No.: 13/734,337

(22) Filed: Jan. 4, 2013

(65) Prior Publication Data

US 2014/0157352 A1 Jun. 5, 2014

(30) Foreign Application Priority Data

Nov. 30, 2012 (KR) ........................ 10-2012-0138151

(51) Int. Cl.
*H04W 76/02* (2009.01)
*H04L 29/06* (2006.01)
*H04W 40/24* (2009.01)

(52) U.S. Cl.
CPC ...................................... *H04L 63/20* (2013.01)
USPC .............................. 726/13; 709/222; 709/228

(58) Field of Classification Search
CPC combination set(s) only.
See application file for complete search history.

(56) References Cited

U.S. PATENT DOCUMENTS

2005/0209876 A1  9/2005  Kennis et al.

FOREIGN PATENT DOCUMENTS

KR  2007-0122045 A  12/2007

OTHER PUBLICATIONS

Multicasting with Mobile IP and The Session Initiation Protocol. Allali et al. Telematia Institute.2000.*
Enable Deep Packet Inspection and Policy Control with the QorIQ P4080 Processor. Siu. FreeScale Semiconductor. Jun. 2010.*
Porting the Session Initiation Protocol to IPv6. Robles et al. IEEE. 2003.*

* cited by examiner

*Primary Examiner* — Venkat Perungavoor
(74) *Attorney, Agent, or Firm* — Sughrue Mion, PLLC

(57) ABSTRACT

Provided are a traffic analysis apparatus and method. The traffic analysis apparatus includes an analysis unit and a policy application unit. The analysis unit determines whether a network packet between at least one client and a server is a packet of a pre-registered SAP session, and, when the network packet is not the packet of the pre-registered SAP session, the analysis unit determines whether the network packet is a packet of a new SAP session. The policy application unit determines whether the network packet includes predetermined monitoring information when the network packet is the packet of the pre-registered SAP session or new SAP session and, when the network packet includes the monitoring information, the policy application unit performs a response action conforming to a predetermined security policy.

16 Claims, 2 Drawing Sheets

APPARATUS AND METHOD FOR ANALYZING AND MONITORING SAP APPLICATION TRAFFIC, AND INFORMATION PROTECTION SYSTEM USING THE SAME

CROSS-REFERENCE TO RELATED APPLICATIONS

This application claims priority under 35 U.S.C. §119 to Korean Patent Application No. 10-2012-0138151, filed on Nov. 30, 2012, the disclosure of which is incorporated herein by reference in its entirety.

TECHNICAL FIELD

The present disclosure relates to a traffic analysis apparatus, and more particularly, to an apparatus and method for analyzing and monitoring SAP application traffic, which analyze traffic of a specific protocol transmitted/received between a client and a server.

BACKGROUND

Recently, personal information is leaking and being misused, and thus damages due to the leakage of personal information are becoming a social issue.

Therefore, the Korean government announced and enforced [Personal Information Protection Act] in September, 2011, for supplementing imperfections of personal information protection and security measure in terms of an information communication service of laws on the use promotion of an information communication network and information protection.

Moreover, detailed guidelines, technology, and compliance solutions for the technical and managerial protection measure of personal information according to Enforcement Ordinance of the Act "Safety Secure Measure Notification on Personal information" are being actively developed by a relevant government organization, academia, and private companies.

In technology and compliance solutions of the related art for the technical and managerial protection measure of personal information, the check of the control, history, and details of an access to a database that stores and is processed personal information, database encryption technology, and a compliance solution using the same are mainly used.

However, the technology and compliance solution of the related art are limited to Oracle, Sybase, DB2, Informix, Altibase, MySQL, MSSQL, and Teradata that are commercial database systems, and developed.

On the other hand, as in SAP which is widely used as the Enterprise Resources Planning (ERP) system, a personal information protection measure for a service or a protocol which does not use only a commercial database system is inadequate.

SUMMARY

Accordingly, the present disclosure provides a traffic analysis apparatus and method for analyzing and monitoring an SAP application packet between a client and a server.

The object of the present invention is not limited to the aforesaid, but other objects not described herein will be clearly understood by those skilled in the art from descriptions below.

In one general aspect, a traffic analysis apparatus includes: an analysis unit determining whether a network packet between at least one client and a server is a packet of a pre-registered SAP session and, when the network packet is not the packet of the pre-registered SAP session, determining whether the network packet is a packet of a new SAP session; and a policy application unit determining whether the network packet includes predetermined monitoring information when the network packet is the packet of the pre-registered SAP session or new SAP session and, when the network packet includes the monitoring information, performing a response action conforming to a predetermined security policy.

In another general aspect, a traffic analysis method, performed by an apparatus for analyzing a network packet between at least one client and a server, includes: determining whether the network packet is a packet of a pre-registered SAP session; determining whether the network packet is a packet of a new SAP session when the network packet is not the packet of the pre-registered SAP session; determining whether the network packet includes predetermined monitoring information when the network packet is the packet of the pre-registered SAP session or new SAP session; and performing a response action conforming to a predetermined security policy when the network packet includes the monitoring information.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
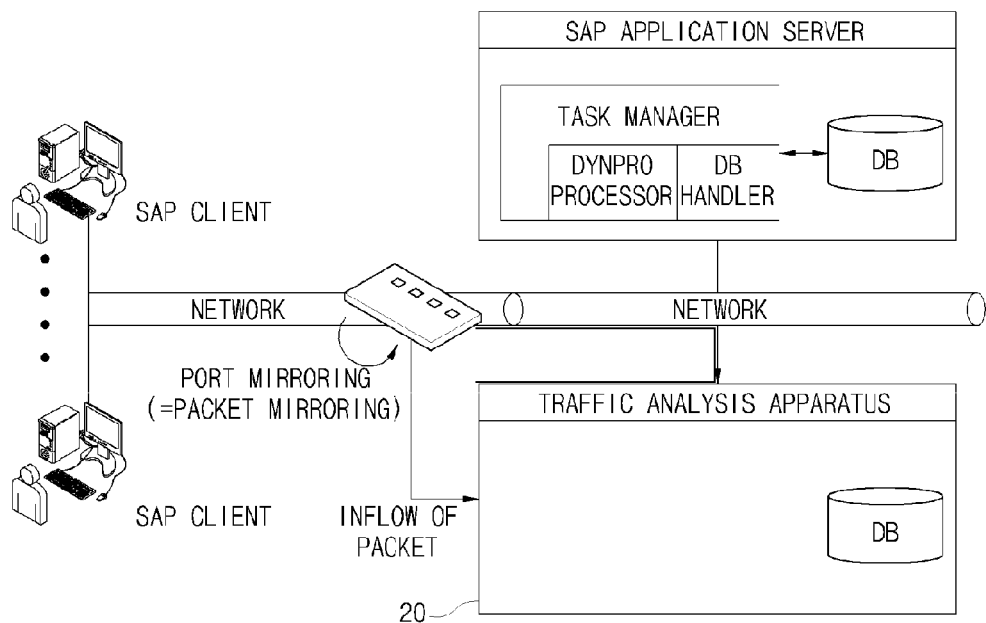
FIG. 1 is a diagram illustrating an SAP application client and an SAP application server according to the present invention.

FIG. 1 is a diagram illustrating an SAP application client and an SAP application server according to the present invention. The SAP is a name of ERP (Enterprise Resource Planning) solution developed by German SAP company and an acronym of Systems, Applications and Products in Data Processing. The SAP is a client-server structure.

As illustrated in FIG. 1, one SAP server is connected to a plurality of SAP clients over a network.

The SAP server is a server that provides an SAP application service, and includes software for the SAP application service. However, hardware of the SAP server may be equal or similar to that of a common server. For example, the SAP server may be the ERP system.

Each of the SAP clients accesses the SAP server and provides the SAP application service, provided by the SAP server, to a user according to the manipulation of the user.

Each SAP client may be a client specialized for the SAP application service, or may be a general client (personal computer (PC), notebook computer, or the like) including software for the SAP application service. In the following description, for convenience of a description, the SAP server is referred to as a server, and the SAP client is referred to as a client.

The following description will be made on an operation in which each client accesses to the server and requests data for the SAP application service, and thus, the server responds to the server.

1. An SAP application service user accesses to the server through the client.

2. The SAP user inputs a user identifier (ID, namely, user account of the client) and a password through a client login screen, and thus logs in to the server.

3. The client checks SAP application service-related data collected from the server. Here, the client may check the collected data within an access authority range of the user.

4. The client changes the SAP application service-related data collected from the server depending on the case, and stores the changed data in the server. In this case, the client may change the collected data within the access authority range of the user.

5. The client logs out from the server.

In the above-described operation, the client and the server transmit and receive information including a packet of an SAP application session through Transmission Control Protocol (TCP)/Internet Protocol (IP) communication. In this case, the SAP is used to provide the SAP application service between the server and the client in an application operation.

The SAP is much used as an application for managerial resources of companies, namely, the ERP system that builds an integrated database in real time for stock and purchase management, production management, sale management, personnel management, financial management, management accounting, etc.

Therefore, an SAP application packet transmitted/received between the client and the server includes personal information and secret information, requiring security, such as accounting, production, and research and development.

Accordingly, a function that records a user's action transmitting and receiving the SAP application packet and warns against or prevents at an abnormal case, and the user's action responding to the abnormal case may be displayed on a screen.

However, the SAP server provides the SAP application service between the SAP client and a commercial database or a self-database such as a Web Application Server (WAS), in the form of a middleware such as a relay server, and thus, it is slightly difficult to check customer information or unauthorized information and perform the user track of a changed work.

To this end, a traffic analysis apparatus according to an embodiment of the present invention analyzes packet of the SAP in a packet mirroring scheme, in a network section between the client and the server.

Hereinafter, the traffic analysis apparatus according to an embodiment of the present invention will be described in detail with reference to FIG. 2.

Figure 2:
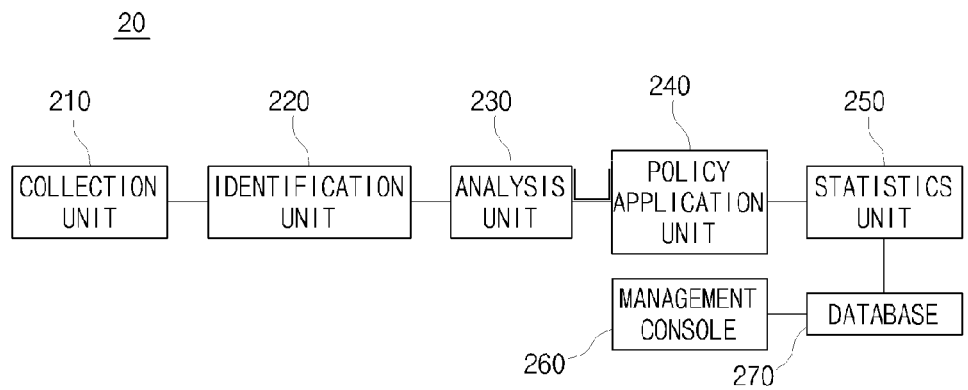
FIG. 2 is a block diagram illustrating a traffic analysis apparatus according to the present invention.

FIG. 2 is a block diagram illustrating the traffic analysis apparatus according to an embodiment of the present invention.

Referring to FIG. 2, the traffic analysis apparatus 20 according to an embodiment of the present invention includes a collection unit 210, an identification unit 220, an analysis unit 230, a policy application unit 240, a statistics unit 250, a database (DB) 270, and a management console 260. Here, the database 270 may be an element of the traffic analysis apparatus 20. However, the database 270 may be disposed outside the traffic analysis apparatus 20, and interface the traffic analysis apparatus 20.

The collection unit 210 collects packets that are transmitted/received between at least one client and a server over a network in the packet mirroring scheme. At this point, the collection unit 210 may collect all packets transmitted/received between the client and the server.

The identification unit 220 extracts a 4-tuple (source IP, source port, destination IP, and destination port) from each of the collected packets, and combines and hashes the extracted 4-tuples to generate a hash value. The identification unit 220 compares the tuple hash values of the collected packets with a pre-registered tuple hash value list, tags the compared result, and transfers the tagged result to the analysis unit 230. Here, the pre-registered hash value is a hash value list that is obtained by hashing 4-tuples of respective sessions of a pre-registered SAP application session list.

The identification unit 220 tags information on the compared result and information (including the tuple hash value of the collected packet) to the collected packet and transfers the tagged packet to the analysis unit 230. At this point, when the tuple hash value of the collected packet is matched with one of the pre-registered tuple hash value list, the identification unit 220 tags information (or code), indicating the matching, the collected packet.

When the tagged packet is received, the analysis unit 230 checks the tagged information to determine whether the packet is a packet of a pre-registered SAP application session. At this point, when it is determined that the tuple hash value of the collected packet is matched with one of the pre-registered tuple hash value list, the analysis unit 230 determines the received packet as the packet of the pre-registered SAP application session.

When the received packet is not the packet of the pre-registered SAP application session, the analysis unit 230 determines whether the received packet is a packet of a new SAP application session on the basis of source port information, destination port information, and signature.

Specifically, the analysis unit 230 determines whether the source or destination port information of the received packet is matched with port information of a prior SAP application server. When the source or destination port information of the received packet is matched with the port information of the SAP application server, the analysis unit 230 determines the received packet as the packet of the new SAP application session. On the other hand, when the source or destination port information of the received packet is not matched with the port information of the SAP application server, the analysis unit 230 checks a signature of a corresponding packet to determine whether the received packet is a packet of the new SAP application session. At this point, when the received packet is a compressed packet, the analysis unit 230 decompresses the packet and checks a source port, a destination port, or a signature.

At this point, when the received packet is not the packet of the pre-registered SAP application session or the packet of the new SAP application session, the analysis unit 230 drops the packet.

On the other hand, the received packet is the packet of the new SAP application session, the analysis unit 230 extracts a session ID, and reconfigures the packets of the new SAP application session in a TCP/IP (Transmission Control Protocol/Internet Protocol) session type, based on the session ID.

The analysis unit 230 identifies and extracts the packet of the new SAP application session, transmitted/received between the client and the server, based on the session ID after setting of a session. Also, the analysis unit 230 adds new SAP application session information, including the extracted session ID and a tuple hash value thereof, to the pre-registered tuple hash value list (or pre-registered SAP application session list) to update the pre-registered tuple hash value list.

The analysis unit 230 classifies the packet of the pre-registered SAP application session or new SAP application session into request data (transmitted from the client to the server) and response data (transmitted from the server to the client).

When a packet of a corresponding SAP application session is the request data (i.e., client transmission data), the analysis unit 230 parses at least one of an SAP system ID, a user ID, a name of a program for the SAP application service, a transaction code, and a message, and objectifies the parsed result in the eXtensible Markup Language (XML) format.

When a packet of a corresponding SAP application session is the response data (i.e., server transmission data), the analysis unit 230 parses at least one of an SAP system ID, a user ID, a program name, a transaction code, and a message, and objectifies the parsed result in the eXtensible Markup Language (XML) format.

When the objectified request data and response data are checked, the policy application unit 240 determines whether the objectified request data and response data violate a security policy. When the objectified request data and response data violate the security policy, the policy application unit 240 performs a response action according to the security policy.

When transaction code information is checked from details of the objectified request data, the policy application unit 240 determines whether a corresponding request is an unapproved transaction code (T-Code) request, on the basis of a source IP address and user ID of a corresponding request packet. In this case, the policy application unit 240 may determine whether a corresponding request is an unapproved transaction code request, on the basis of a pre-registered security policy. At this point, the client may select a menu of a program for the SAP application service, thereby transmitting a transaction code request.

When a request conforming to a checked transaction code is an unapproved transaction code request, the policy application unit 240 processes a predetermined response action conforming to the security policy. Here, the predetermined response action may be an operation of sending a warning message to a manager or an operation of blocking a corresponding session.

The policy application unit 240 checks whether the objectified request data and the response data include at least one piece of monitoring information of a personal information pattern, a sensitive information pattern, and a predetermined text string, and calculates the total number of detections by monitoring information.

Here, the personal information pattern may be to define various personal information such as a resident registration number (foreign registration number), a passport number, and a driver's license number as a regular expression. The sensitive information pattern may be to define information, related to accounting, production, and research and development, as a regular expression. Also, the text string may be defined by the manager, and for example, may be the combination of specific texts included in sensitive information or personal information.

The policy application unit 240 performs a response action conforming to a predetermined security policy corresponding to the total number of detections by monitoring information.

For example, when specific monitoring information has been detected from the response data ten times, the policy application unit 240 may send a warning message to the manager or block a corresponding session. At this point, the policy application unit 240 may provide information about a session, corresponding to a request packet or a response packet including monitoring information, to the manager.

The policy application unit 240 performs the response action, and then stores a log, including at least one of the history and result of the performed response action, objectified response data corresponding to the response action, and objectified request data corresponding to the response data, in a database (DB) 270. Here, the result of the response action may be the change (for example, response setting by the manager) after performing the response action such as sending of a warning message to the manager.

The statistics unit 250 generates daily statistics data on a check history (i.e., the total number of monitoring information) of monitoring information by user ID using the stored log, and accumulates and averages the generated daily statistics data at certain intervals (for example, one week, or one day) to generate statistics data by certain interval. In this case, the statistics unit 250 may calculate daily statistics data on the total number of requests including the monitoring information by user ID and the total number of detections of a response including the monitoring information in units of a day.

The statistics unit 250 calculates monitoring information check patterns by user ID by using the statistics data by certain interval, and stores the monitoring information check patterns in the database 270.

For example, the statistics unit 250 may calculate a monitoring information check pattern indicating that a user having a user ID "A" transmits or receives a resident registration number five times or less for one month and transmits or receives a card number tem time or less, and store the monitoring information check pattern in the database 270.

Here, the monitoring information check pattern by user ID may be used as a threshold value of the security policy.

For example, when a personal information check pattern exceeding a predetermined monitoring information check pattern is detected, the manager may set a security policy that allows a warning message to be sent to the manager. When a more tight control is needed, the manager may set a security policy that allows a corresponding session to be blocked.

However, the monitoring information check pattern is usable immediately after the next-day statistics are calculated from the first start time, and is based on a detection reference of an abnormal symptom instead of a detection reference of an abnormal case. Therefore, performing a strong response (for example, block of a session) by the monitoring information check pattern as in an abnormal case requires a caution.

The objectified request data and response data may be used to reproduce a Graphic User Interface (GUI) screen, corresponding to a GUI screen of the client including information of an input field, an output field, a frame, a table, and various buttons, in a screen of the server. This may be realized through the management console 260, and will be described below.

The management console 260 provides a first interface for setting and applying a security policy and a second interface for requesting the reproduction of details of the GUI screen of the client. Here, the security policy includes a response action to a case in which monitoring information, information on an approved transaction code request, and an unapproved transaction code is checked, and a response action conforming to the total number of detections by monitoring information.

Specifically, when the manager selects the second interface, the management console 260 may reproduce at least one of login histories by user ID, a request history from the client to the server after login, and a response history of the server responding to the request history, identically to details of the GUI screen of the client, using at least one of the objectified request data and response data, thereby displaying the at least one history on a screen.

The manager may check an abnormal request action, such as the change and check history of abnormal data, on the basis of an IP address of the client, a user ID, or transaction code of the client, using the stored log. Also, the manager may check and search an error message. Here, the log includes a response action, request data corresponding to the response action, and response data corresponding to the request data, and thus, the manager may check an IP address, a user ID, and a transaction code from the log.

When the policy application unit 240 checks an SAP error message from the objectified request data or response data, the policy application unit 240 stores a log on objectified request data or response data associated with the error message. At this point, the policy application unit 240 may inform the manger of the occurrence of an error.

Therefore, to solve a system error, the manager may reproduce the occurrence of the system error depending on the GUI screen of the client through the management console 260.

As described above, the present invention analyzes and monitors the SAP application packet used as a protocol for the ERP system, and provides personal information protection measure technology and solution for the analyzed and monitored result, thus preventing the leakage of information through the SAP application packet.

Moreover, the present invention reproduces an error message occurring in the SAP system or a request history of the client and details of a response corresponding to the request history identically to the GUI screen of the client, thereby enabling the manager to check a system error and the leakage of monitoring information.

The following description will be made on an example that reproduces a GUI screen through the management console according to an embodiment of the present invention.

As described above, the traffic analysis apparatus 20 according to the present invention identically reproduces the GUI screen of the client when corresponding request data is being transmitted, on the basis of client request data included in the stored log.

For example, through the reproduced GUI screen, the manger of the traffic analysis apparatus 20 may determine that a user having a user ID "CNUH07" in a client using an IP "192.168.1.88" is requesting login to a server using an IP "210.206.54.160" when monitoring information is being leaked.

Likewise, the traffic analysis apparatus 20 identically reproduces a client GUI screen when corresponding response data is being received, on the basis of server response data included in the stored log.

For example, through the reproduced GUI screen, the manger of the traffic analysis apparatus 20 may determine that a client using an IP "192.168.0.105" receives "list of materials delivered at 24 Nov., 2009", from a server using an IP "175.117.145.66" when monitoring information is being leaked.

As described above, the present invention not only stores log information including leaked sensitive information, or a response action to the leakage of the sensitive information, but also reconfigures a GUI screen of a client, thereby enabling the provision of a clear evidentiary material when legal dispute occurs.

Moreover, the present invention reproduces an error message occurring in the SAP system or a request history of the client and details of a response corresponding to the request history identically to the GUI screen of the client, thereby enabling the manager to check a system error and the leakage of monitoring information.

Hereinafter, a traffic analysis method according to an embodiment of the present invention will be described with reference to FIG. 3.

Figure 3:
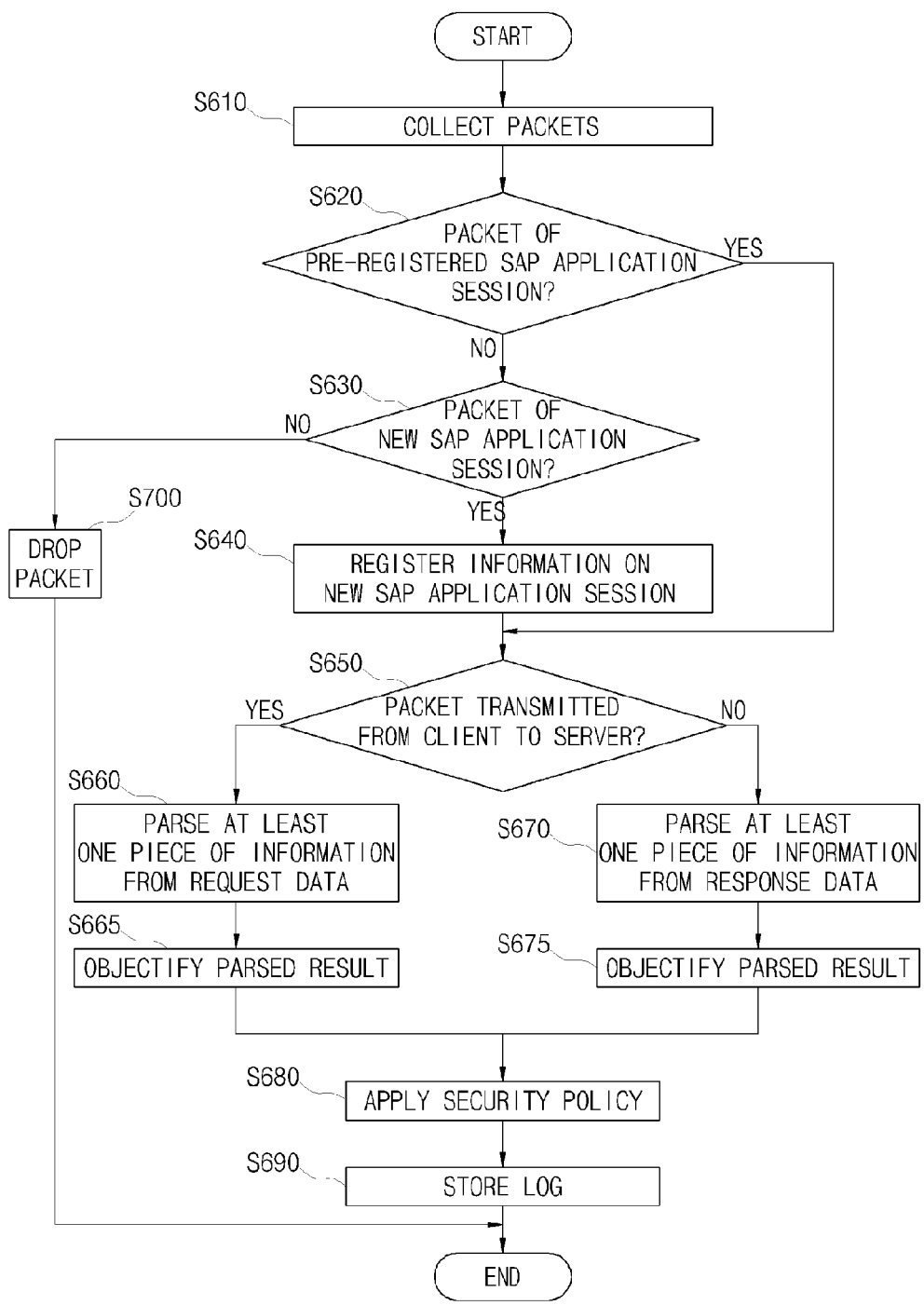
FIG. 3 is a flowchart illustrating a traffic analysis method according to the present invention.

FIG. 3 is a flowchart illustrating a traffic analysis method according to the present invention.

Referring to FIG. 3, the traffic analysis apparatus 20 collects packets between a client and a server in the packet mirroring scheme, in operation S610.

The traffic analysis apparatus 20 determines whether the collected packet is a packet of a pre-registered SAP application session in operation S620. In this case, the traffic analysis apparatus 20 checks whether a hash value of 4-tuple of the collected packet is matched with a hash value of 4-tuple of the pre-registered SAP application session, thereby determining whether the collected packet is the packet of the pre-registered SAP application session.

When the collected packet is not the packet of the pre-registered SAP application session, the traffic analysis apparatus 20 determines whether the collected packet is a packet of a new SAP application session in operation S630. In this case, the traffic analysis apparatus 20 checks whether at least one of a source port, destination port, and signature of the collected packet corresponds to port information and signature of the new SAP application session, thereby determining whether the collected packet is the packet of the new SAP application session.

When the collected packet is the packet of the new SAP application session the traffic analysis apparatus 20 registers information about the new SAP application session in operation S640. Here, the information on the new SAP application session may be a hash value that is obtained by hashing 4-tuple of a corresponding session.

The traffic analysis apparatus 20 determines whether the packet of the pre-registered SAP application session and the packet of the new SAP application session are client transmission data (request data) transmitted to the server in operation S650.

When a packet of a corresponding SAP application session is the request data, the traffic analysis apparatus 20 parses at least one of an SAP system ID, a user ID, a name of a program for the SAP application service, a transaction code, and a message from the packet in operation S660.

The traffic analysis apparatus 20 objectifies the parsed result in the XML format, in operation S665. Subsequently, the traffic analysis apparatus 20 may reproduce a GUI screen corresponding to SAP user input data using the objectified request data when a request of a manager is received.

When a packet of a corresponding SAP application session is the response data (server transmission data), the traffic analysis apparatus 20 parses at least one of an SAP system ID, a user ID (user account of the client), a name of a program for the SAP application service, a transaction code, and a message from the packet in operation S670.

The traffic analysis apparatus 20 objectifies the parsed result in the XML format, in operation S675. Subsequently, the traffic analysis apparatus 20 may reproduce a GUI screen corresponding to a GUI screen of the client receiving the response data, using the objectified response data.

The traffic analysis apparatus 20 determines whether at least one of the objectified response data and request data violates a predetermined security policy. And, when at least one of the objectified response data and request data violates the predetermined security policy, the traffic analysis apparatus 20 performs a response action corresponding to the security policy in operation S680.

In operation S690, the traffic analysis apparatus 20 stores a log, including a response action, request data and response data corresponding to the response action, in the database 270.

When it is determined in operation S630 that the collected packet is not the packet of the new SAP application session, the traffic analysis apparatus 20 drops the packet in operation S700.

As described above, as in an SAP enterprise resource system, the present invention checks an abnormal request action on the basis of an IP address, user ID, and transaction code of a client accessing a system in which a number of pieces of personal information and sensitive information are transmitted and received.

Moreover, the present invention reproduces an error message occurring in the SAP system or a request history of the client and details of a response corresponding to the request history identically to the GUI screen of the client, thereby enabling the manager to check a system error and the leakage of monitoring information.

As described above, the present invention analyzes and monitors the SAP application packet which is transmitted/received between a client and a server over a network, thus preventing the leakage of information through the SAP application packet.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A traffic analysis apparatus, comprising:
a processor;
an identification unit executed by the processor, extracting and hashing 4-tuple of a network packet between at least one client and a server to generate a hash value, comparing the generated hash value with a hash value of 4-tuple of a pre-registered SAP session, and tagging the compared result to the network packet;
an analysis unit executed by the processor, determining whether the network packet between the at least one client and the server is a packet of the pre-registered SAP session based on the tagged result and, when the network packet is not the packet of the pre-registered SAP session, determining whether the network packet is a packet of a new SAP session; and
a policy application unit executed by the processor, determining whether the network packet comprises predetermined monitoring information when the network packet is the packet of the pre-registered SAP session or new SAP session and, when the network packet comprises the monitoring information, performing a response action conforming to a predetermined security policy.

2. The traffic analysis apparatus of claim 1,
wherein when the generated hash value is matched with the pre-registered hash value as the compared result, the analysis unit determines the network packet as the packet of the pre-registered SAP session.

3. The traffic analysis apparatus of claim 1, wherein the analysis unit determines whether the network packet is the packet of the new SAP session using at least one of source port information, destination port information, and signature of the network packet.

4. The traffic analysis apparatus of claim 1, wherein when the network packet is the packet of the pre-registered SAP session or new SAP session, the analysis unit classifies the network packet into request data transmitted from the client to the server and response data transmitted from the server to the client.

5. The traffic analysis apparatus of claim 4, wherein,
when a transaction code is checked from the request data, the policy application unit determines whether a request corresponding to the request data is an unapproved transaction code request, on the basis of a source IP address and a user ID that are checked from the request data, and
when the request is the unapproved transaction code request as the determined result, the policy application unit performs a response conforming to the security policy.

6. The traffic analysis apparatus of claim 1, wherein when the network packet is the packet of the pre-registered SAP session or new SAP session, the analysis unit parses at least one of an SAP system ID, a user ID, a name of a program for an SAP application service, a transaction code, and a message from the network packet, and objectifies the parsed result in an XML format.

7. The traffic analysis apparatus of claim 6, further comprising a management console providing an interface that reproduces the same GUI screen as a GUI screen of the client corresponding to the network packet using the objectified network packet according to a request of a manager.

8. The traffic analysis apparatus of claim 1, wherein the policy application unit performs the response action, and stores a log, comprising at least one of a history of the response action, a result conforming to the response action, and a network packet corresponding to the response action, in a database.

9. The traffic analysis apparatus of claim 8, further comprising a management console, wherein the management console provides an interface, which checks the log to check at least one of an IP address, a user ID, and a transaction code and searches change or check of abnormal data from the checked at least one, to a manager.

10. The traffic analysis apparatus of claim 1, wherein when the network packet is not the packet of the pre-registered SAP session or new SAP session, the analysis unit drops the network packet.

11. A traffic analysis method in an apparatus for analyzing a network packet between at least one client and a server, comprising:

extracting and hashing 4-tuple of the network packet between the at least one client and the server to generate a hash value, comparing the generated hash value with a hash value of 4-tuple of a pre-registered SAP session, and tagging the compared result to the network packet, determining whether the network packet is a packet of the pre-registered SAP session based on the tagged result;

determining whether the network packet is a packet of a new SAP session when the network packet is not the packet of the pre-registered SAP session;

determining whether the network packet comprises predetermined monitoring information when the network packet is the packet of the pre-registered SAP session or new SAP session; and performing a response action conforming to a predetermined security policy when the network packet comprises the monitoring information.

12. The traffic analysis method of claim 11, further comprising dropping the network packet when the network packet is not the packet of the pre-registered SAP session or new SAP session.

13. The traffic analysis method of claim 11, further comprising:

parsing at least one of an SAP system ID, a user ID, a name of a program for an SAP application service, a transaction code, and a message from the network packet when the network packet is the packet of the pre-registered SAP session or new SAP session; and objectifying the parsed result in an XML format.

14. The traffic analysis method of claim 13, further comprising reproducing and displaying the same GUI screen as a GUI screen of the client corresponding to the network packet using the objectified network packet according to a request of a manager.

15. The traffic analysis apparatus of claim 1, wherein the monitoring information includes at least one piece of information of a personal information pattern, a sensitive information pattern and a predetermined text string and the policy application unit calculates a total number of detections of the monitoring information and performing the response action based on the total number of detections of the monitoring information.

16. The traffic analysis method of claim 11, wherein the monitoring information includes at least one piece of information of a personal information pattern, a sensitive information pattern and a predetermined text string and the performing the response action comprises calculating a total number of detections of the monitoring information and performing the response action based on the total number of detections of the monitoring information.

* * * * *